J. MOSES.
GALVANIC SPECTACLES.
No. 78,534. Patented June 2, 1868.
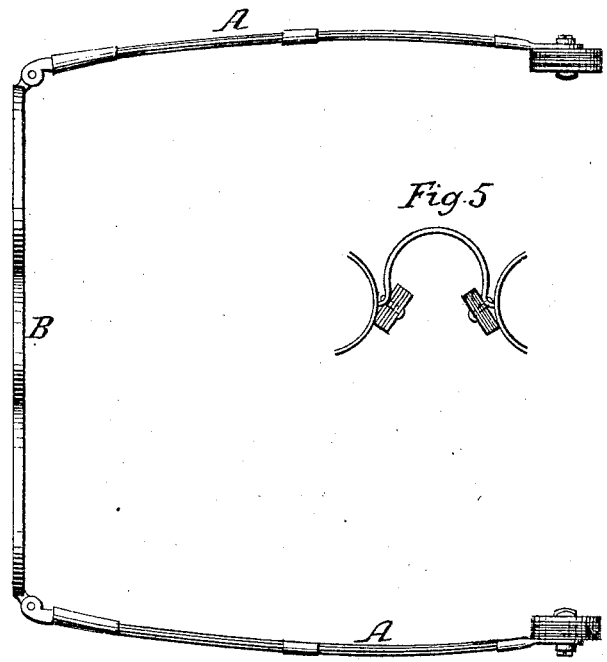
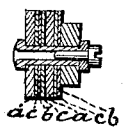
Witnesses.
A. D. Ansell.
M. M. Livingston.
Inventor.
Judah Moses.

United States Patent Office.

JUDAH MOSES, OF HARTFORD, CONNECTICUT.

*Letters Patent No. 78,534, dated June 2, 1868.*

IMPROVEMENT IN GALVANIC SPECTACLES.

*The Schedule referred to in these Letters Patent and making part of the same.*

TO ALL WHOM IT MAY CONCERN:

Be it known that I, JUDAH MOSES, of the city of Hartford, in the county of Hartford, and State of Connecticut, have invented a new and improved Electro-Galvanic Spectacles; and I do hereby declare that the following is a full, clear, and exact description of the same, reference being had to the accompanying drawing, which forms part of this specification.

My invention consists in the combination, with the temples or front of a pair of spectacles, of an electro-galvanic battery or batteries arranged in such relation thereto that an electrical current may be produced, whereby a person is enabled to apply electricity to the nerves of the head and obtain the therapeutic effects thereof. In the accompanying drawing—

Figure 1 is a plan view of a simple form of my invention.

Figure 2 is a sectional view of one temple of a pair of spectacles, showing an insulated rivet connecting a voltaic pile thereto.

Figure 3 is a cross-section of the voltaic pile, taken on the plane of the line $x\ x'$.

Figure 4, in red, is a modification of my invention.

A A designate the bows or temples of a pair of spectacles, which are jointed to the front, B, in any suitable manner. In fig. 1 the said temples consist of a number of steel wires, and in fig. 3 of a silver tube. Any suitable mode of constructing the temples and front of a pair of spectacles which will permit the carrying out of my invention may be adopted.

To the outer end of each temple or bow I secure a voltaic pile, which, in the example shown, consists of alternate plates of zinc, $a$, and platinum, $b$, separated by cloth, $c$, which may be saturated in brine or acid water, and dried before being adjusted, the inner plate, or that which is to rest against the head being zinc on the one temple, thus constituting the positive pole of the battery, and that on the other temple next the head being platinum, thus constituting the negative pole of the battery. These voltaic piles are secured to the temple, in the present instance, by a rivet provided with an insulated end, $d$, where it rests against the head of the person who wears the spectacles.

The bows or temples of the spectacles are made of such length as to bring their ends, and consequently the voltaic piles, between the external part of the ear and the head, and there being no hair at this spot, the voltaic piles will rest against the skin, and at the same time be concealed.

The moisture of the head or perspiration coming in contact with the voltaic piles, and especially so when it is enough in quantity to moisten the cloth between the plates of metal, is sufficient to create a decided electrical current, which necessarily affects the nerves of the head, inasmuch as it is between the poles of the battery.

I do not limit my invention to the employment, in combination with a pair of spectacles, of any particular kind of battery. I have illustrated the voltaic battery, considering it the one most easily applied. I might name many batteries which could be connected to the spectacles in various ways and insure the result sought, namely, the passing of an electrical current through the metal of the spectacles, so as to operate with all of its therapeutic effects upon the capital nerves. And the voltaic pile or other battery may be connected with the front of the spectacles, say on the nose-piece, as shown in red in fig. 4, and used either with or without the batteries on the temples. In the former case we should have a more powerful battery, and in the latter case the effect would be particularly upon the olfactory nerves.

If it should be desired to increase the effect of the voltaic battery above described, the two piles can be immersed in brine or acid water before the spectacles are applied to the head; or a receptacle, containing brine or acid water, may be attached to the batteries, so as to keep the piles moist all the while, and thus increase the effect of the battery.

The beneficial action upon the nervous system obtained by a proper application of electricity is so well known at the present time that it is not necessary here to enter into a discussion of the subject; suffice it to say that by applying an electrical current to the nerves of the head, through the medium of a pair of spectacles, I obtain excellent therapeutic results.

What I claim as my invention, and desire to secure by Letters Patent, is—

The combination, with the temples or front of a pair of spectacles, of an electric battery or batteries, so arranged and connected therewith that an electrical current may be caused to pass through the same, substantially as and for the purposes herein specified.

JUDAH MOSES.

Witnesses:
A. D. ANSELL,
M. M. LIVINGSTON.